US010585867B2

(12) United States Patent
Horowitz et al.

(10) Patent No.: US 10,585,867 B2
(45) Date of Patent: Mar. 10, 2020

(54) SYSTEMS AND METHODS FOR GENERATING PARTIAL INDEXES IN DISTRIBUTED DATABASES

(71) Applicant: MongoDB, Inc., New York, NY (US)

(72) Inventors: Eliot Horowitz, New York, NY (US); David Lenox Storch, Brooklyn, NY (US); Max Jacob Hirschhorn, New York, NY (US); J. Rayvid Rassi, Los Angeles, CA (US)

(73) Assignee: MongoDB, Inc., New York, NY (US)

( * ) Notice: Subject to any disclaimer, the term of this patent is extended or adjusted under 35 U.S.C. 154(b) by 147 days.

(21) Appl. No.: 15/605,196

(22) Filed: May 25, 2017

(65) Prior Publication Data

US 2017/0344588 A1    Nov. 30, 2017

Related U.S. Application Data

(60) Provisional application No. 62/341,475, filed on May 25, 2016.

(51) Int. Cl.
*G06F 17/00* (2019.01)
*G06F 16/22* (2019.01)

(52) U.S. Cl.
CPC ............... *G06F 16/2228* (2019.01)

(58) Field of Classification Search
CPC .... G06F 16/278; G06F 16/22; G06F 16/2228; G06F 16/2272; G06F 16/2264; G06F 16/2471

See application file for complete search history.

(56) References Cited

U.S. PATENT DOCUMENTS

2015/0302035 A1*  10/2015  Raghavan ........... G06F 16/2228
                                                707/741

* cited by examiner

*Primary Examiner* — Truong V Vo
(74) *Attorney, Agent, or Firm* — Wolf, Greenfield & Sacks, P.C.

(57) ABSTRACT

According to one aspect, methods and systems are provided for creating partial indexes in a distributed database environment. The database includes an index engine configured to receive at least one index field, a criteria field, and a criteria condition, wherein the criteria field is not included in the at least one index field; and generate an index comprising the at least one index field from at least one record of the plurality of records and a pointer to the at least one record of the plurality of records, wherein the criteria field of the at least one record of the plurality of records satisfies the criteria condition. The database further includes a query engine configured to receive a search query containing the at least one index field; and search the index for the at least one index field.

21 Claims, 8 Drawing Sheets

FIG. 8

SYSTEMS AND METHODS FOR GENERATING PARTIAL INDEXES IN DISTRIBUTED DATABASES

RELATED APPLICATIONS

This Application claims priority under 35 U.S.C. § 119(e) to U.S. Provisional Application Ser. No. 62/341,475, entitled "SYSTEMS AND METHODS FOR GENERATING PARTIAL INDEXES IN DISTRIBUTED DATABASES" filed on May 25, 2016, which is herein incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The present invention relates to distributed database systems and methods for generating database indexes to improve database performance.

Background Discussion

Database indexes in currently available database systems are data structures that store copies of certain columns (or fields) of data in the database. The database index can be used to speed database operations involving those index columns, because it avoids the time- and resource-intensive act of sequentially loading and examining every field in every record of data. Partial indexes databases are available in some relational database systems wherein the index only includes entries for those rows that match an index column and a defined criteria.

SUMMARY

According to various embodiments, indexes support the efficient execution of queries in any database (e.g., relational, no-SQL, dynamic schema, or an unstructured database (including the known database MONGODB)). For example, without indexes, a MongoDB database system would be required to perform a collection scan (i.e. a scan of every document in a collection (logical group of documents)) to select those documents that match a query statement made on a collection in the database. If an appropriate index exists for a query, a search process can find the index and use the index to limit the number of documents that the search process must inspect to respond to the query.

According to some embodiments, in non-relational environments indexes can be implemented as special data structures that store a small portion of the collection's data set in an easy to traverse form. A collection refers to a logical grouping of documents. Documents represent a base unit of data storage that contain fields and values. In non-relational or dynamic schema environments, rigid rules for the structure of the document are not enforced (unlike relational tables where data entries must conform to row and column definitions). These properties make the implementation of indexes and partial indexes more challenging than in relational architectures, where the data's format is known in advance.

In some embodiments, indexes are stored as documents that include a small portion of the collection's data set in an easy to traverse form. For example, the index stores the value of a specific field or set of fields, ordered by the value of the field. The ordering of the index entries also supports efficient equality matches and range-based query operations. In addition, the search process can return sorted results by using the ordering in the index.

One drawback of some conventional database indexes is that any criteria for inclusion in the index cannot be based on fields not included in the index. In non-relational architectures, including filters based on non-indexed fields is especially challenging. The creation of the index must account for the potential of any unstructured document in a collection to contain the index field, but also must account for matches on any of the documents in the collection based on the filer condition. Various embodiments perform these operations without the benefit of a strict schema that defines which tables include the indexed field in the first instance.

For example, a user of a database for processing ecommerce orders may wish to create an index on a single order_id field, thereby facilitating faster retrieval of records according to their order ID. Yet there may be thousands or millions of historical orders stored in the system, whereas the user is interested only in the relatively small number of unfulfilled orders in existence at a given time. Such conventional indexes would not allow the user to specify criteria that a document should be included in the index according to any field other than order_id, for example, by specifying that documents included in the index must have a status field equal to "open." The alternative is to include fields in the index that, while not helpful to indexing and locating records, are used as criteria for inclusion in the index. The inclusion of such extraneous fields in the index may adversely affect the performance of searches relying on the index, thereby diluting the usefulness of the index.

There is therefore a need for a system and method for providing a database index that can be based on criteria fields not included as index fields for the database. The well-known MongoDB database system is an example of a "No SQL" database that can benefit from integration of partial indexes, in which one or more conditions are applied based on non-indexed fields so that the index represents a subset of documents stored in a database or database collection.

In other examples, a database system can include replica sets, in which multiple nodes contain replicated data. For instance, individual member nodes may respond to database operation requests (e.g., read and write operations) directed to the replica set, allowing for scalability, as well as redundancy in the event of a node failure.

Various aspects are directed to database systems that manage and/or provide for generation of partial indexes. In one example, partial indexes can be particularly challenging in a database having a non-relational or dynamic database structure.

Stated broadly, various aspects provide for the creation of a partial database index using a criteria field distinct from any index fields. According to an embodiment, management interfaces and processes are provided that enable such filtered partial indexes, thereby reducing a number of steps to be performed to create a filtered index, and accordingly reducing processing time and the opportunity for error. According to various implementations, the partial index can also improve query efficiency, for example, based on a reduce size of any corresponding partial index. In other embodiments, a larger number of partial indexes can be maintained in memory than larger conventional indexes, improving the database response capability.

According to one aspect a database system is provided. The database system comprises a database for storing a plurality of database records, an index engine configured to receive at least one index field, a criteria field, and a criteria condition, wherein the criteria field is not included in the at least one index field, and generate an index comprising the at least one index field from at least one record of the plurality of records and a pointer to the at least one record of the plurality of records, wherein the criteria field of the at least one record of the plurality of records satisfies the criteria condition, a query engine configured to: receive a search query containing the at least one index field; and search the index for the at least one index field, according to one embodiment, wherein the plurality of database records are a collection of documents in a non-relational database.

According to one embodiment, the index engine is further configured to identify, in the collection of documents, at least one document configured to store the criteria field. According to one embodiment, the index engine is further configured to resolve the criteria condition which comprises a comparison operator and a comparison value. According to one embodiment, the index engine is further configured to resolve the criteria condition based on the comparison operator selected from a group consisting of a greater-than operator, a less-than operator, an equals operator, and a does-not-equal operator. According to one embodiment, the index engine is further configured to resolve the criteria condition wherein the criteria condition comprises a logical operator for determining whether the criteria field is set in the at least one record of the plurality of records.

According to one aspect a method for creating a database index for a plurality of database records is provided. The method comprises acts of, receiving at least one index field to be included in the database index, receiving a criteria field and a criteria condition, the criteria field not included in the at least one index field, and generating an index comprising the at least one index field from at least one record of the plurality of records and a pointer to the at least one record of the plurality of records, wherein the criteria field of the at least one record of the plurality of records satisfies the criteria condition.

According to one embodiment, the plurality of database records are a collection of documents in a non-relational database. According to one embodiment, the method further comprises identifying, in the collection of documents, at least one document configured to store the criteria field. According to one embodiment, the criteria condition comprises a comparison operator and a comparison value. According to one embodiment, the comparison operator is selected from the group consisting of a greater-than operator, a less-than operator, an equals operator, and a does-not-equal operator. According to one embodiment, the criteria condition comprises a logical operator for determining whether the criteria field is set in the at least one record of the plurality of records.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures.

DETAILED DESCRIPTION

A system and method are provided for creating a partial index for a database in which criteria fields other than the index fields can be used to filter which record should be included in the index. In particular, a criteria field from at least one record and a criteria condition are provided as part of a request to create a partial index, so-called because it contains entries for only those records for which the criteria field satisfies the criteria condition. Records are searched, and the index fields from those records satisfying the criteria are included in the partial index. By allowing the criteria for inclusion to depend on fields other than the index fields, indexes can be optimized for the particular arrangement and usage of a database, without regard to what fields are included in the index.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
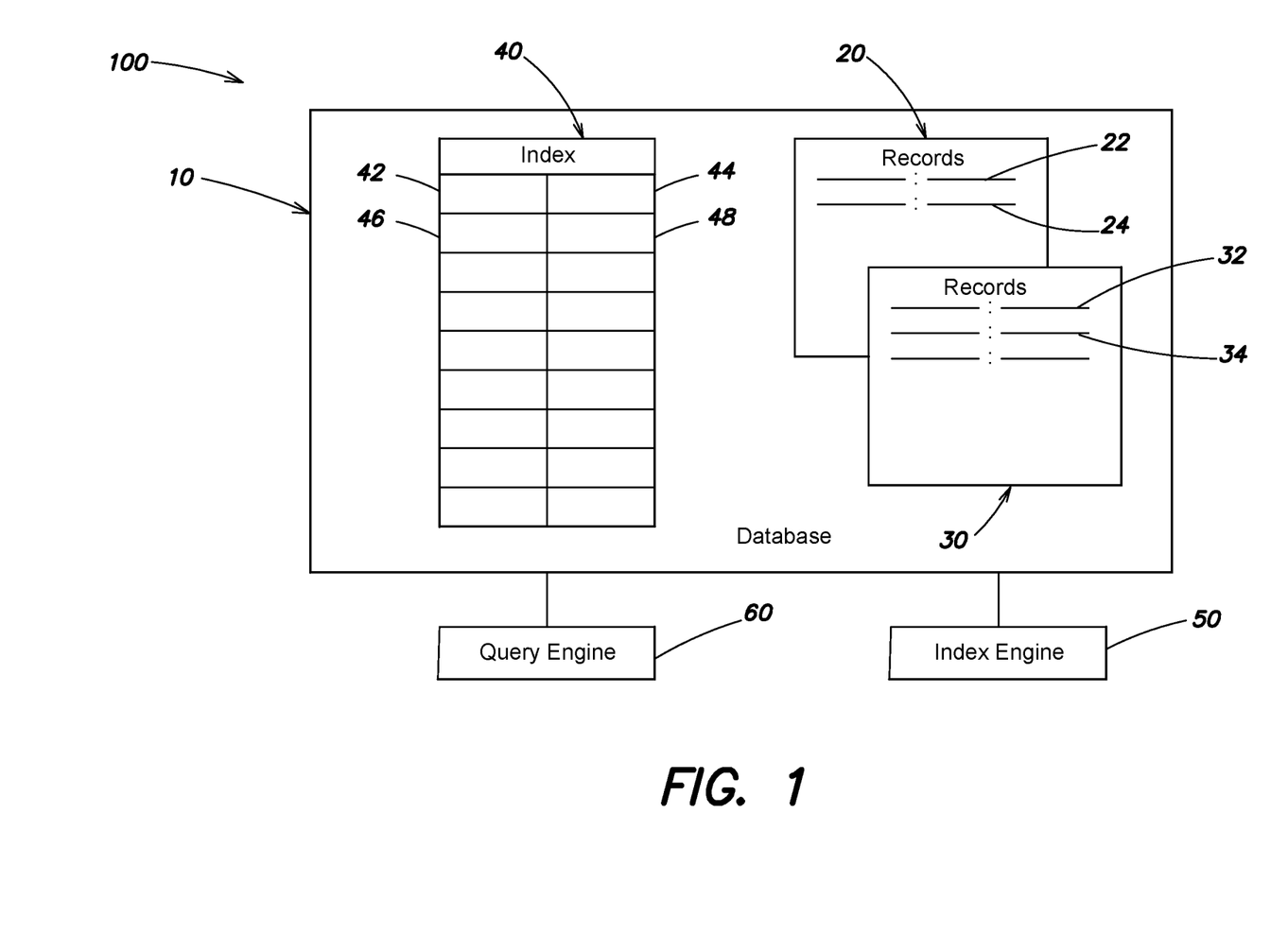
FIG. 1 illustrates a block diagram of an example architecture for a database according to aspects of the invention.

An example of a database system 100 is shown in FIG. 1. The database system 100 illustrates a system in which data may be stored and retrieved. For example, the database system 100 may be a standalone database, or may be a primary node or a secondary node within a replica set, wherein particular data is stored by more than one node to ensure high availability and stability in the event that one or more nodes becomes unavailable for some period of time. In other embodiments, the database system 100 may be a shard server storing a "shard," or certain range of data, within a database system. Requests to a database system 100 implementing a shard server are directed by the system to the server storing the particular range of data where the data in question would be located.

The database system 100 may be arranged as a relational database, or as a non-relational database, such as the MongoDB database system offered by MongoDB, Inc. of New York, N.Y. and Palo Alto, Calif. The database system 100 includes a database 10 configured to store a primary copy of the database data. In a preferred embodiment, the database system 100 is a non-relational database system wherein the database 10 stores one or more collections of documents allowing for dynamic schemas. A collection is a group of documents that can be used for a loose, logical organization of documents. In such scenarios, a document is a collection of attribute-value associations relating to a particular entity, and in some examples forms a base unit of data storage for the managed database system. Attributes are similar to rows in a relational database, but do not require the same level of organization, and are therefore less subject to architectural constraints. In one example, the documents follows the known JSON format; in another, the documents may be stored as BSON documents. It should be appreciated, however, that the concepts discussed herein are applicable to relational databases and other database formats, and this disclosure should not be construed as being limited to non-relational or "no-SQL" databases in the disclosed embodiments.

In one example, the database data may include logical organizations of subsets of database data. The database data may include index data, which may include copies of certain fields of data that are logically ordered to be searched efficiently. Each entry in the index may consist of a key-value pair that represents a document or field (i.e., the value), and provides an address or pointer to a low-level disk block address where the document or field is stored (the key). The database data may also include an operation log ("oplog"), which is a chronological list of write/update operations performed on the data store during a particular time period. The oplog can be used to roll back or re-create those operations should it become necessary to do so due to a database crash or other error. Primary data, index data, or oplog data may be stored in any of a number of database formats, including row store, column store, log-structured merge (LSM) tree, or otherwise.

In other embodiments, the database system 100 is a relational database system, and the database 10 stores one or more tables comprising rows and columns of data according to a database schema.

The database 10 includes a plurality of records 20, 30 (e.g., documents in a non-relational database) each storing a number of attribute-value pairs. In one example, records 20, 30 may be employee records. Record 20 may be configured to store the value "Smith" for the attribute last_name, and record 30 may be configured to store the value "Jones" for the attribute last_name.

The database 10 further includes an index 40, which stores a copy of an index field 42, 46 for at least one of the plurality of records 20, 30. Index fields 22, 32 in records 20, 30 are used as the basis for creating the index 40. Thus, the index field 42, 46 corresponds to a value comprising or derived from the value of the attribute-value pair stored at index fields 22, 32 of the records 20, 30. The index 40 further comprises, for each index field 42, 46, a link 44, 48 to the record 20, 30 represented by the index field 42, 46. To continue the example above, the index field 22 may be the last_name attribute having a value of "Smith" for document 20. A copy of the index field 22 ("Smith") is stored as the index field 42 in index 40. A link 44 contains a link, address, or other identifier allowing the system to locate record 20.

It will be appreciated that the index 40 may be a composite index storing more than one index field for each record, with each index field representing the value of an attribute-value pair stored in a record. Continuing the previous example, the index 40 containing the index field 22 of last_name may contain an additional index field of first_name. In such an example, the index 40 may be optimized based on a particular index field (typically the first column of the index).

The database system 100 further includes an index engine 50 configured to populate the index 40 as discussed herein. The index engine 50 generates the index with reference to a criteria field 24, 34 stored in records 20, 30. The index field 22, 32 of records 20, 30 may only be stored in the index 40 if the criteria fields 24, 34 of those records satisfy the criteria. For example, if the criteria field 24 of record 20 were employee_status, the index engine 50 may be configured to include the index field 22 of record 20 if the criteria field 24 (i.e., employee_status) has a value of "retired." The index engine 50 may be configured to create and/or update the index 40 on the occurrence of certain events (e.g., a write operation being performed on an indexed document or the index field stored therein) or after a certain amount of time.

The database system 100 further includes a query engine 60 configured to interact with the data in the database 10 by performing read and write operations. The query engine 60 selectively refers to the index 40 in order to perform database operations as efficiently as possible. For example, where the index field 42 in index 40 represents the last_name attribute, a query on the field last_name may use the index 40 to quickly locate any records satisfying the query criteria. The query engine 60 may follow the link stored in any such index entries to access the responsive records.

According to another example, if a document which matches the partialFilterExpression contains none of the fields specified in an index key pattern, then the system inserts an index key into the index with null values for the missing fields:

```
> db.c.drop( )
true
> db.c.createIndex({a: 1}, {partialFilterExpression: {b: {$gt: 3}}})
{
    "createdCollectionAutomatically" : true,
    "numIndexesBefore" : 1,
    "numIndexesAfter" : 2,
    "ok" : 1
}
> db.c.insert({b: 99})
WriteResult({ "nInserted" : 1 })
> db.c.find( ).hint({a: 1}).returnKey( )
{ "a" : null }
```

It will be appreciated that the index engine 50 and the query engine 60 are shown as standalone components for illustration purposes only. In some embodiments, the index engine 50 and the query engine 60 are incorporated in a database application 20 that handles data requests, manages data access, and performs background management operations for the database system 100. The database application 20 is configured to interact with various components of the database system 100, including at least one storage engine (not shown) for writing data to the database 10.

Figure 2:
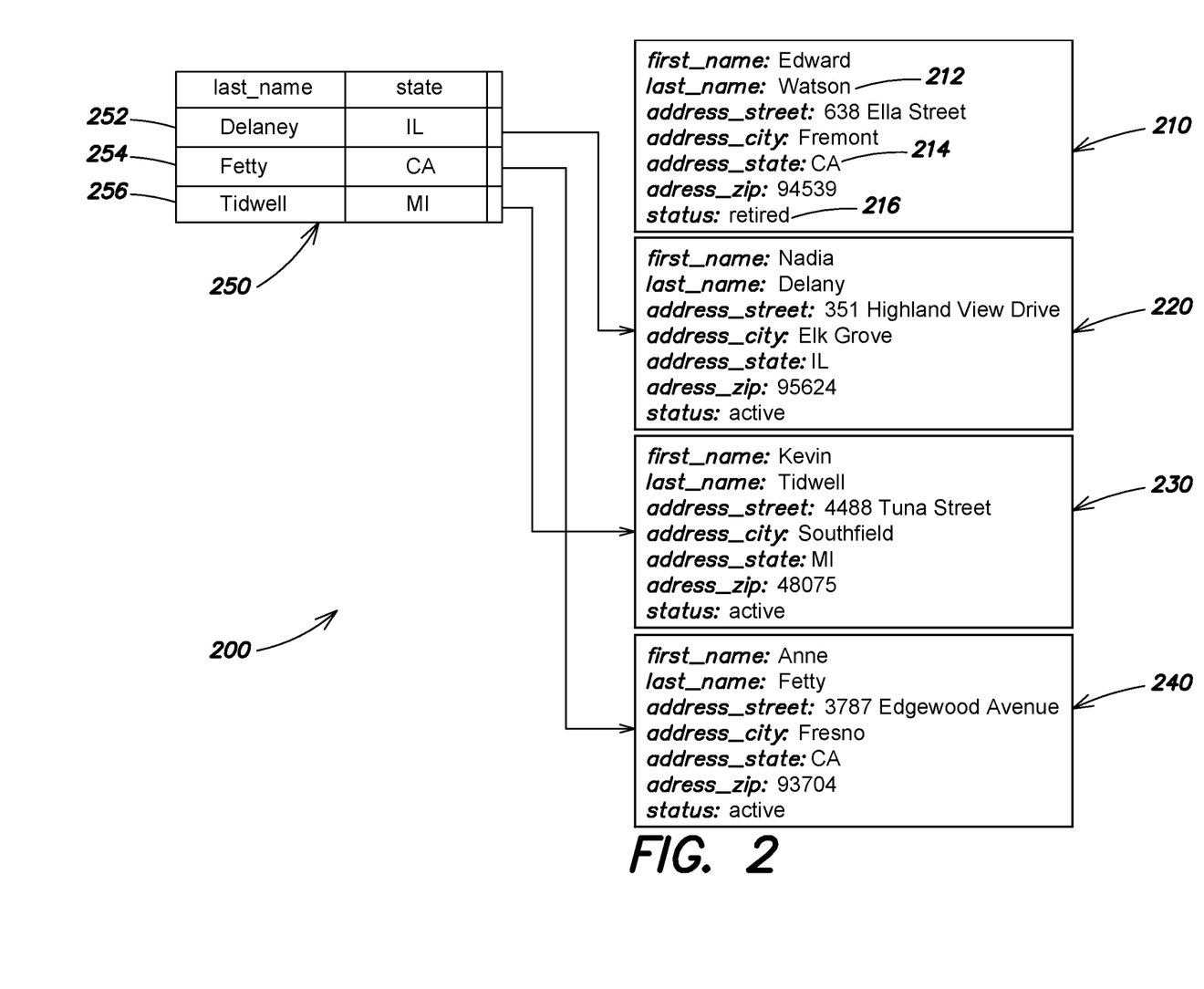
FIG. 2 illustrates a representation of the data stored in a database and an index according to aspects of the invention.

An exemplary collection of records 210-240 and corresponding index 250 is shown in FIG. 2. In this example, each of the records 210-240 contains information about an individual employee, including full name, address, and employment status. In this example, the fields last_name and address_state are used as the index fields 212, 214, and the employee_status field is used as the criteria field 216. The criteria field 216 may be used to filter which records are to be included in the index 250, having records 252 "Delaney," 254 "Fetty," and 256 "Tidwell." In this example, the index 250 has been generated using the criteria that a record should be included in the index 250 if the employee_status field (i.e., criteria field 216) for that record has a value of "active." In this example, the records 220, 230, 240 are included in the index, since their criteria fields 216 satisfy the criteria for inclusion in the index—that is, the employees identified in each of those records has an employee_status of "active." By contrast, record 210 is not included because the associated employee has an employee_status of "retired."

Criteria for inclusion in an index may be provided through a database command, for example, at the time the index is created. As an example, the following code may create the index 250 discussed in the example above:

db.inventory.createIndex({last_name: 1, address_state: 1}, {partialFilterExpression: {employee_status: "active"}})

Criteria may be provided in any number of formats, including logical operators, comparison operators, and the like. For example, the following pseudocode may create an index of the last names of employees whose salary is greater than $50,000 a year:

db.inventory.createIndex({last_name: 1}, {partialFilterExpression: {salary: {$gt: 50000}}})

Similarly, the following code may create an index of the last names of employees whose home address is not located in Connecticut:

db.inventory.createIndex({last_name: 1}, {partialFilterExpression: {address_state: {$ne: "CT"}}})

In addition to the textual criteria examples given here, non-textual criteria may also be provided. For example, geographic criteria may be provided for records that include geolocation information, such as latitude and longitude coordinates. The criteria may be expressed in terms of distance from a particular location as expressed by the coordinates, or may be expressed in terms of a location's inclusion or exclusion from a geometric shape centered on a geographic location (e.g., a circle having a 30 mile radius around a particular city, or a polygon that circumscribes a particular voting district).

Figure 3:
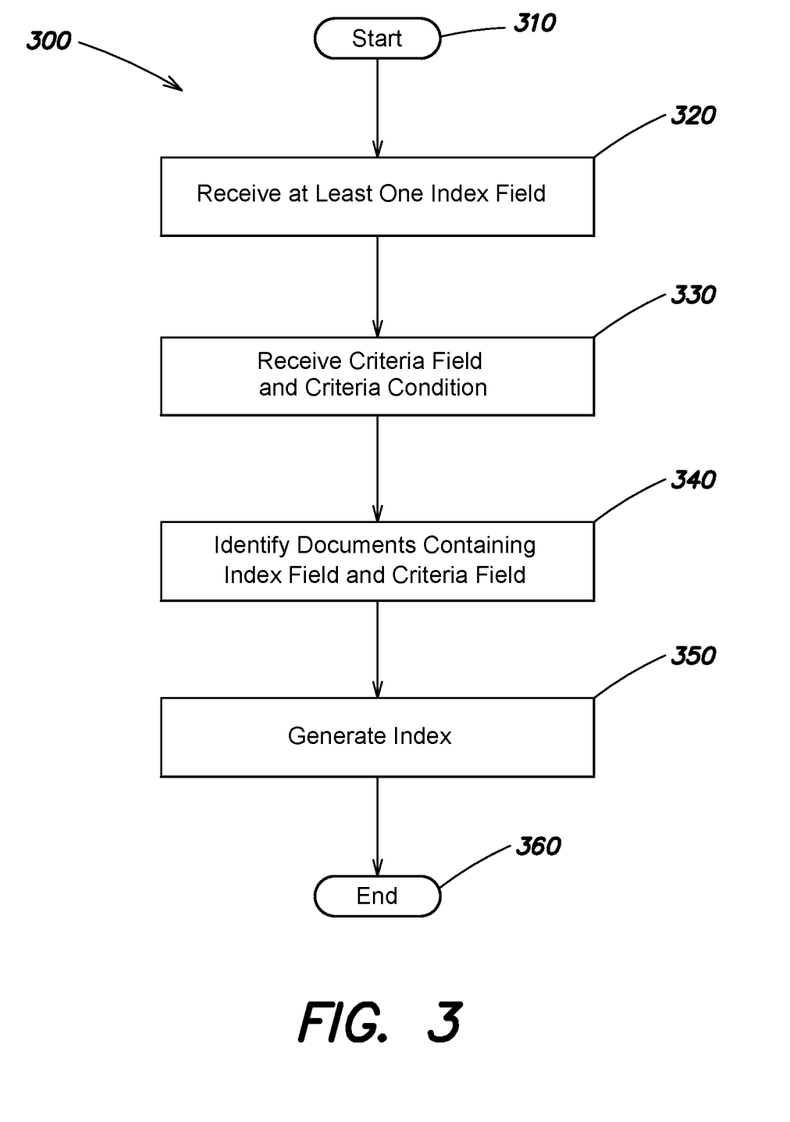
FIG. 3 illustrates an example process flow for encrypting a database according to aspects of the embodiment.

A process 300 of generating a partial index for a database using a criteria field is shown in FIG. 3.

At step 310, process 300 begins.

At step 320, at least one index field to be included in the database index is received, and at step 330, a criteria field and a criteria condition are received, with the criteria field not included in the at least one index field (i.e., the criteria field is not one of the index fields). The criteria may be received in textual form as part of a function call or command to create the index, For example, a "createIndex" function may be called, with the index fields(s), criteria field, and criteria condition passed to the function as parameters. In one example, the criteria field and criteria condition are provided in the form of a logical expression. Such a logical expression may indicate, for example, that a record should be included in the index if "salary>=50000," "status NOT NULL," or the like. In other embodiments, a graphical interface may be provided through which a user may define the index by graphically selecting index fields, criteria fields, criteria conditions, and the like.

At optional step 340, in a preferred embodiment in which a non-relational database is employed, at least one document configured to store the index field and/or criteria field is identified. In non-relational database systems, there is typically not strict enforcement of a schema indicating what fields must be stored by records (in this case, documents). In such embodiments, it may therefore be necessary to determine if a document potentially to be included in the index includes the index field and/or criteria field. In some embodiments, the absence of one or both of the fields from the document causes that document to be excluded from further consideration for the index, since there is no way to determine if the document should be included (due to the lack of a criteria field) or to include it in the index (due to the lack of an index field).

At step 350, an index is generated. Each entry in the index includes a field based on the at least one index field from at least one record of the plurality of records that satisfies the criteria condition, as well as a pointer to the at least one record of the plurality of records. In one embodiment, the index may be stored as a B-tree, B+ tree, or variation thereof, with the index being searchable by traversing the leaves of the tree structure. B-trees and their variants are described in "The Ubiquitous B-Tree" by Douglas Comer (Computing Surveys, Vol. 11, No. 2, June 1979), which is hereby incorporated by reference in its entirety. In other embodiments, the index is stored in an array or other structure known in the art. The record pointer stored in each entry in the index may be an address or pointer to a low-level disk block address where the record is stored. The index may be ordered in a way that facilitates the rapid location and retrieval of the indexed records. For example, the entries of the index may be ordered alphabetically according to the index field (or the first index field if multiple index fields are included).

The index field stored in an entry in the index may be an exact copy of the corresponding index field from the record, or may be a function of the index field from the record. In some embodiments, such a function may be applied to the index field to ensure data consistency or improved performance of the index and/or database. For example, the index field from the record may be converted to all uppercase letters in the index. During a database operation, the index field in a record may also be converted to all uppercase letters before being compared to the index entry, thereby simplifying the logic and processing necessary for performing the comparison.

In some embodiments, it may be desirable to rearrange the index field to more evenly distribute entries in the index. For example, a B-tree index built on an incrementally-created ID_number would be unbalanced, as each new ID_number would be inserted to the right of the previous entry. Such a scheme may also cause contention for memory space, as the entries created during a particular time would be stored in adjacent memory locations. Subsequent entries must be queued to access this area of memory, potentially slowing down performance of the system. In one example, the index field may be rearranged by reversing the order of the text within. In such an example, the number "123456" would be stored as "654321," whereas the next number "123457" would be stored as "754321" in a different portion of the index than "654321," given the different first digits. Other schemes for minimizing data clusters may also be implemented.

At step 360, process 300 ends.

Figure 4:
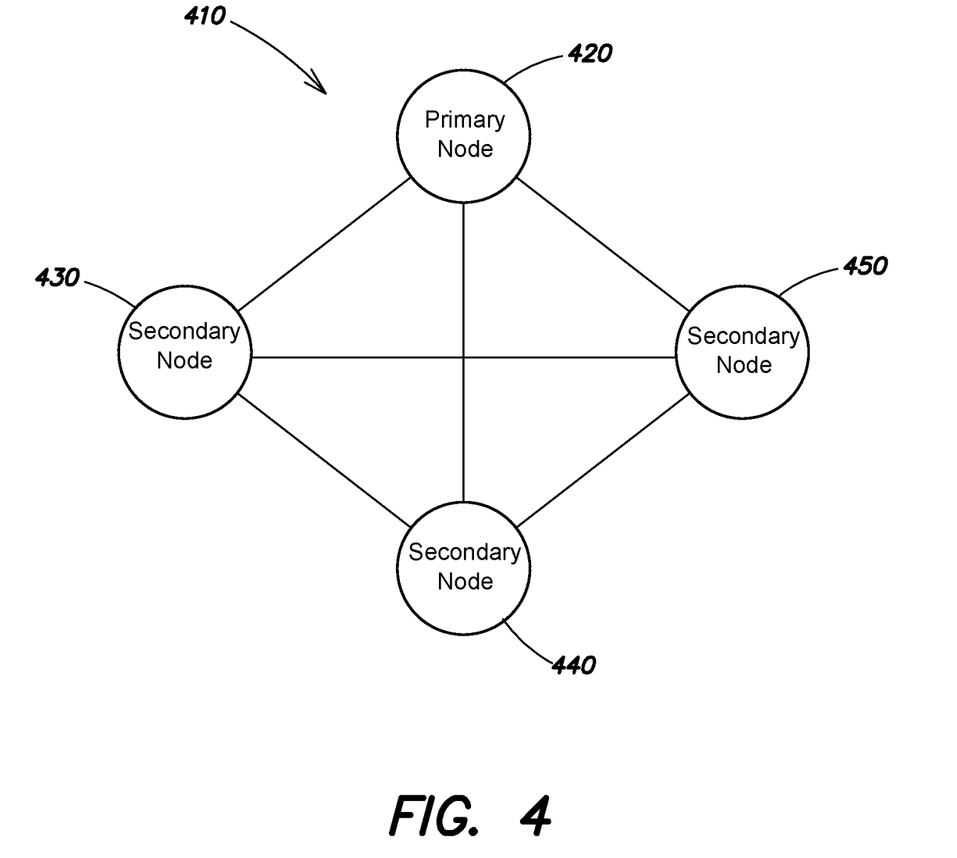
FIG. 4 illustrates a block diagram of an example architecture for a database replica set, according to aspects of the invention.

The embodiments shown and discussed with respect to FIGS. 1 and 2 depict a single database system. Yet in some embodiments, multiple storage nodes may be provided and arranged in a replica set, such as the embodiments described in U.S. patent application Ser. No. 12/977,563, which is hereby incorporated by reference in its entirety. FIG. 4 shows a block diagram of an exemplary replica set 410. Replica set 410 includes a primary node 420 and one or more secondary nodes 430, 440, 450, each of which is configured to store a dataset that has been inserted into the database. As discussed in more detail below, separate indexes may be created for the same database on different nodes, with the indexes structured or optimized according to the node's role in the replica set as a primary node or a secondary node. For example, regionally distributed nodes can each have its own partial index built on the same primary field, but that implements different filter conditions related to the position of the respective node.

The primary node 420 may be configured to store all of the documents currently in the database, and may be considered and treated as the authoritative version of the database in the event that any conflicts or discrepancies arise, as will be discussed in more detail below. While three secondary nodes 430, 440, 450 are depicted for illustrative purposes, any number of secondary nodes may be employed, depending on cost, complexity, and data availability requirements. In a preferred embodiment, one replica set may be implemented on a single server, or a single cluster of servers. In other embodiments, the nodes of the replica set may be spread among two or more servers or server clusters.

The primary node 420 and secondary nodes 430, 440, 450 may be configured to store data in any number of database formats or data structures as are known in the art. In a preferred embodiment, the primary node 420 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In one embodiment, both read and write operations may be permitted at any node (including primary node 420 or secondary nodes 430, 440, 450) in response to requests from clients. The scalability of read operations can be achieved by adding nodes and database instances. In some embodiments, the primary node 420 and/or the secondary nodes 430, 440, 450 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440, 450 disallowing write operations. In such embodiments, the primary node 420 receives and processes write requests against the database, and replicates the operation/transaction asynchronously throughout the system to the secondary nodes 430, 440, 450. In one example, the primary node 420 receives and performs client write operations and generates an oplog. Each logged operation is replicated to, and carried out by, each of the secondary nodes 430, 440, 450, thereby bringing those secondary nodes into synchronization with the primary node 420.

In some embodiments, the primary node 420 and the secondary nodes 430, 440, 450 may operate together to form a replica set 410 that achieves eventual consistency, meaning that replication of database changes to the secondary nodes 430, 440, 450 may occur asynchronously. When write operations cease, all replica nodes of a database will eventually "converge," or become consistent. This may be a desirable feature where higher performance is important, such that locking records while an update is stored and propagated is not an option. In such embodiments, the secondary nodes 430, 440, 450 may handle the bulk of the read operations made on the replica set 410, whereas the primary node 430, 440, 450 handles the write operations. For read operations where a high level of accuracy is important (such as the operations involved in creating a secondary node), read operations may be performed against the primary node 420.

Given these different roles of the primary node 420 and the secondary nodes 430, 440, 450, it may be desirable to create, for each database, an index on each node suitable for that node's role in the replica set. For example, because a primary node 420 may primarily perform write operations, an index may be created on a unique system-generated identifier that can be used to quickly locate the most recently-added record in order to find a memory location for a new record. By contrast, the performance of a secondary node 430 that performs repeated queries on a particular field (e.g., a last name of an employee) may be improved by creating an index based on that last name. In some embodiments, indexes may therefore be created for each node, with each index possibly including different index fields. In other embodiments, multiple index fields may be stored in each index, but the ordering of the columns and/or the data within the columns may be optimized by node. The index in the previous example may include the unique system-generated identifier and the employee's last name on each node, but the order of those columns, and the order in which the entries are sorted, may vary by node.

In such an environment, indexes may be created for a particular database on each node of the replica set, with the indexes on different nodes being optimized according to the data characteristics and role of the node. In one embodiment, secondary nodes are primarily responsible for responding to read requests. The secondary nodes may also be tasked with aggregation operations with high frequency, thus an index on the specific field, filtered on fields outside the index and tailored to select documents of interest (e.g., that are not written to with any frequency, that specify a status of interest, that are the basis of aggregation operations (e.g., aggregations operations process data records and return computed results—aggregation operations group values from multiple documents together, and can perform a variety of operations on the grouped data to return a single result), etc.) thereby facilitates faster retrieval and processing of aggregation operation. Additionally, the partial index created is more compact that an conventional index and may be accessed and maintained in memory without the same burden on the system as a conventional index.

In another embodiment, primary nodes in a replica set are typically responsible for write operations, thus a partial index that includes a broad index term filtered on record fields that are frequently written provides an index optimized to the role of the primary node without the drawback of indexing the field that is frequently written—which would require frequent regeneration of the index.

It will be appreciated that the difference between the primary node 420 and the one or more secondary nodes 430, 440, 450 in a given replica set may be largely the designation itself and the resulting behavior of the node; the data, functionality, and configuration associated with the nodes may be largely identical, or capable of being identical. Thus, when one or more nodes within a replica set 410 fail or otherwise become available for read or write operations, other nodes may change roles to address the failure. For example, if the primary node 420 were to fail, a secondary node 430 may assume the responsibilities of the primary node, allowing operation of the replica set to continue through the outage. This failover functionality is described in U.S. application Ser. No. 12/977,563, the disclosure of which has been incorporated by reference.

Each node in the replica set 410 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 420 may be connected by a LAN, a WAN, or other connection to one or more of the secondary nodes 430, 440, 450, which in turn may be connected to one or more other secondary nodes in the replica set 410. Connections between secondary nodes 430, 440, 450 may allow the different secondary nodes to communicate with each other, for example, in the event that the primary node 420 fails or becomes unavailable and a secondary node must assume the role of the primary node.

Example Indexes

Figure 8:
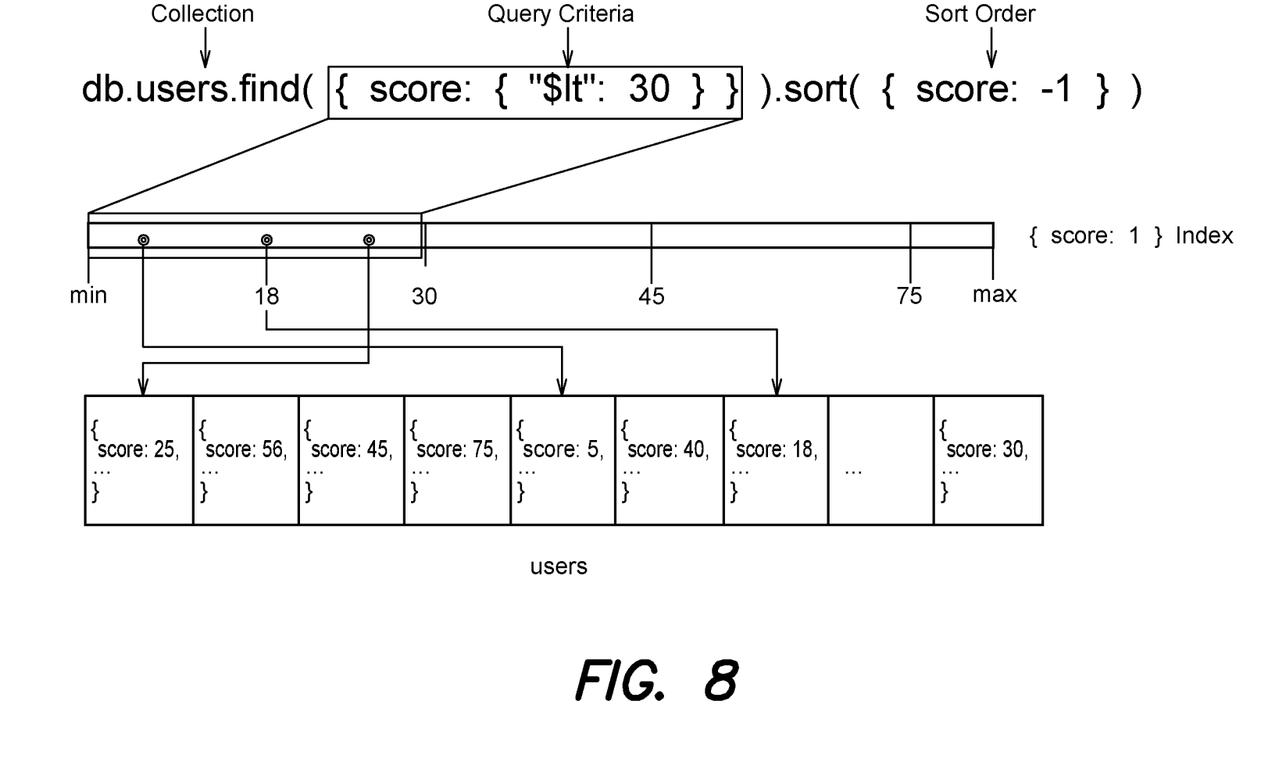
FIG. 8 illustrates an example query on indexed data, according to one embodiment.

Illustrated in FIG. 8 is a query that selects and orders the matching documents using an index. According to various embodiments, indexes in MongoDB are similar to indexes in other database systems. In one example, indexes are defined on the database system at the collection level and the database system is configured to support indexes on any field or sub-field of the documents in a collection.

Collections within the database are a grouping of documents. A collection is similar to an relational database table, however, collections do not enforce a schema. Documents within a collection can have different fields. Typically, documents in a collection have a similar or related purpose. Documents define the basic unit of data storage in the database system. According to various embodiments, documents are analogous to JSON objects but are configured in the database in a more type-rich format known as BSON. According to various embodiments, indexes can be implemented with a B-tree data structure, although other embodiments can implement other data structures to store and/or access index data (e.g., row store, column store, log-structured merge (LSM) tree, etc.).

In some embodiment, the system can be configured to create and access a number of different index types to support specific types of data and queries. For example, single field indexes can be defined to support user-defined ascending/descending indexes on a single field of a document. In other examples, compound indexes can be created, as well as multi-key indexes (e.g., to index the content stored in arrays). Various embodiments can implement geo-spatial indexes (e.g., planar geometry and spherical geometry based indexes), text indexes (e.g., for search for string content in a collection), and/or hashed indexes (e.g., to support hash based sharding). Each of these indexes can be augmented by filter criteria to generate partial index versions of each index type.

As discussed above, partial indexes only index the documents in a collection that meet a specified filter expression. For example, by indexing a subset of the documents in a collection, partial indexes have lower storage requirements and reduced performance costs for index creation and maintenance. Reducing the storage required improves execution efficiency for the partial index and therefore the database as a whole. In further embodiments, smaller footprints (i.e., storage size) translates into the ability to better maintain partial indexes in memory for faster execution.

According to one embodiment, users can create a partial via a command line interface, may do so via a graphical tool, or other management tool by entering a create index command accompanied by a filter expression (e.g., via a db.collection.createIndex( )method with a partialFilterExpression option). According to one example, a partialFilterExpression option is configured to accept as an input a document that specifies the filter condition using:

equality expressions (i.e. field: value or using the $eq operator), $exists: a true test expression, $gt (greater than), $gte (greater than or equal), $lt (less than), $lte (less than or equal) expressions, $type expressions (e.g., specifies a BSON type), $and operator (e.g., logical AND operation on an array of two or more expressions (e.g. <expression1>, <expression2>, etc.) and selects the documents that satisfy all the expressions in the array) (some embodimetns, may limit $and to the top-level only).

For example, the following operation creates a compound index that indexes only the documents with a rating field greater than 5.

```
db.restaurants.createIndex(
    { cuisine: 1, name: 1 },
    { partialFilterExpression: { rating: { $gt: 5 } } }
)
```

According to various embodiment, the system is configured to accept specification of a filter expression (e.g., via a partialFilterExpression command option) for all defined index types. In some environments, the system is configured to determine if query matches an existing partial index as a condition predicate. In other words the system is configured to use partial indexes when the query or sort option matches the filter condition or is a subset of the filter condition specified in the partial index. According to one embodiment, the system is configured not to use a partial index for a query or sort operation if using the index results in an incomplete result set.

According to various embodiments, to use a partial index in resolving a query, the system first determines that a query contains the filter expression (or a modified filter expression that specifies a subset of the filter expression) as part of its query condition.

For example, given the following index:

```
db.restaurants.createIndex(
    { cuisine: 1 },
    { partialFilterExpression: { rating: { $gt: 5 } } }
)
```

The following query can use the index since the query predicate includes the condition rating: {$gte:8} that matches a subset of documents matched by the index filter expression ratings: {$gt: 5}:

db.restaurants.find({cuisine: "Italian", rating: {$gte: 8} })

However, to provide a contrary example, the following query cannot use the partial index on the cuisine field because using the index results in an incomplete result set. Specifically, the query predicate includes the condition rating: {$lt: 8} while the index has the filter rating: {$gt: 5}. That is, the query {cuisine:"Italian", rating: {$lt: 8} } matches more documents (e.g. an Italian restaurant with a rating equal to 1) than are indexed.

db.restaurants.find({cuisine: "Italian", rating: {$lt: 8} })

The system is configured to detect this inconsistency and ignore any partial index that fails to cover the conditions of the query. In one embodiment, the system is configured to project the data needed to respond to the query and evaluate the data needed against the index to determine if the index may be used. For example, the index may be stored as a B-tree and the system can project the data needed to respond to the query and scan or search the tree to determine coverage. Thus various embodiments as part of processing partial indexes are configured to determine that the search query is guaranteed to match a set of documents that is contained within the subset of documents before using the partial index in generating a set of results.

Similarly, in another embodiment, the system can determine that the following query cannot use the partial index because the query predicate does not include the filter expression and using the index would return an incomplete result set.

db.restaurants.find({cuisine: "Italian" })

According to some embodiments, the system is configured to determine that the query predicate matches the filter expression of the partial index or resolves into a subset of the filter expression of the partial index before using the partial index to respond to a query.

As discussed, partial indexes determine the index entries based on the specified filter. The filter can include fields other than the index keys and can specify conditions other than just an existence check. For example, a partial index can implement:

```
db.contacts.createIndex(
    { name: 1 },
    { partialFilterExpression: { name: { $exists: true } } }
)
```

This partial index example supports queries based on an existence filter made on the name field (contained in the index). However, the system is also configured to resolve a partial index that specifies a filter expressions on fields other than the index key. For example, the following operation creates a partial index, where the index is on the name field but the filter expression is on the email field:

```
db.contacts.createIndex(
    { name: 1 },
    { partialFilterExpression: { email: { $exists: true } } }
)
```

In order for the system to executed based on accessing the partial index, a query optimizer function must evaluate the query predicate and determined that the result includes a non-null match on the email field as well as a condition on the name field.

For example, the following query can use the index above (i.e., the system is configured to determine that the query conditions match the filter conditions of the partial index (matching including generate a subset of the filter conditions):

db.contacts.find({name: "xyz", email: {$regex: A.org$/} })

However, a contrary examples includes the following query that cannot use the partial index above:

db.contacts.find({name: "xyz", email: {$exists: false} })

Some embodiments implement restrictions on partial indexes that are created. For example, the system restricts creation of multiple versions of an index that differ only in the options. As such, the system can restrict creation of multiple partial indexes that differ only by the filter expression.

Example: Partial Index for a Collection

Consider a collection restaurants containing documents that resemble the following:

```
{
    "_id" : ObjectId("5641f6a7522545bc535b5dc9"),
    "address" : {
        "building" : "1007",
        "coord" : [
            -73.856077,
            40.848447
        ],
        "street" : "Morris Park Ave",
        "zipcode" : "10462"
    },
    "borough" : "Bronx",
        "cuisine" : "Bakery",
    "rating" : { "date" : ISODate("2014-03-03T00:00:00Z"),
        "grade" : "A",
        "score" : 2
        },
    "name" : "Morris Park Bake Shop",
    "restaurant_id" : "30075445"
}
```

The system is configured to accept definition of a partial index on the borough and cuisine fields, for example specifying a filter for choosing only to index documents where the rating.grade field is A:

```
db.restaurants.createIndex(
    { borough: 1, cuisine: 1 },
    { partialFilterExpression: { 'rating.grade': { $eq: "A" } } }
)
```

Then, the following query on the restaurants collection is resolved by the system using the partial index to return the restaurants in the Bronx with rating.grade equal to A:

db.restaurants.find({borough: "Bronx", 'rating.grade': "A"})

In contrast, the system is configured to determine that the following query cannot use the partial index—because the query expression does not include the rating.grade field:

db.restaurants.find({borough: "Bronx", cuisine: "Bakery" })

Example: Partial Index with Unique Constraint

According to various embodiments, the system is configured to resolve partial indexes on the documents in a collection that meet a specified filter expression. In another embodiment, the system enables users to specify both a partialFilterExpression and a unique constraint on the partial index. The unique constraint is configured to ensure that the fields (including indexed fields) do not store duplicate values (i.e. the system enforces uniqueness for the indexed fields responsive to a unique constraint). In some examples, the system is configured to resolve the unique constraint on the documents that meet the filter expression. Thus, a partial index with a unique constraint does not prevent the insertion of documents that do not meet the unique constraint, if the documents do not meet the filter criteria.

For example, with a collection named users that contains the following documents:

{"_id": ObjectId("56424f1efa0358a27fa1f99a"), "username": "david", "age": 29}
  {"_id": ObjectId("56424f37fa0358a27fa1f99b"), "username": "amanda", "age": 35}
  {"_id": ObjectId("56424fe2fa0358a27fa1f99c"), "username": "rajiv", "age": 57}

The following operation is executed by the system to create an index that specifies a unique constraint on the username field and a partial filter expression age: {$gte: 21}.

```
db.users.createIndex(
    { username: 1 },
    { unique: true, partialFilterExpression: { age: { $gte: 21 } } }
)
```

According to one embodiment, the system is configured to resolve the index such that the index prevents the insertion of the following documents (since documents already exist with the specified usernames and the age fields are greater than 21):

db.users.insert({username: "david", age: 27})
  db.users.insert({username: "amanda", age: 25})
  db.users.insert({username: "rajiv", age: 32})

However, the following documents with duplicate usernames are allowed by the system (since the unique constraint only applies to documents with age greater than or equal to 21).

db.users.insert({username: "david", age: 20})
  db.users.insert({username: "amanda" })
  db.users.insert({username: "rajiv", age: null})

The various processes described herein can be configured to be executed on the systems shown by way of example in FIGS. 1, 2, and 4. The systems and/or system components shown can be programmed to execute the processes and/or functions described.

Additionally, other computer systems can be configured to perform the operations and/or functions described herein. For example, various embodiments according to the present invention may be implemented on one or more computer systems. These computer systems may be, specially configured, computers such as those based on Intel Atom, Core, or PENTIUM-type processor, IBM PowerPC, AMD Athlon or Opteron, Sun UltraSPARC, or any other type of processor. Additionally, any system may be located on a single computer or may be distributed among a plurality of computers attached by a communications network.

A special-purpose computer system can be specially configured as disclosed herein. According to one embodiment of the invention the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 5:
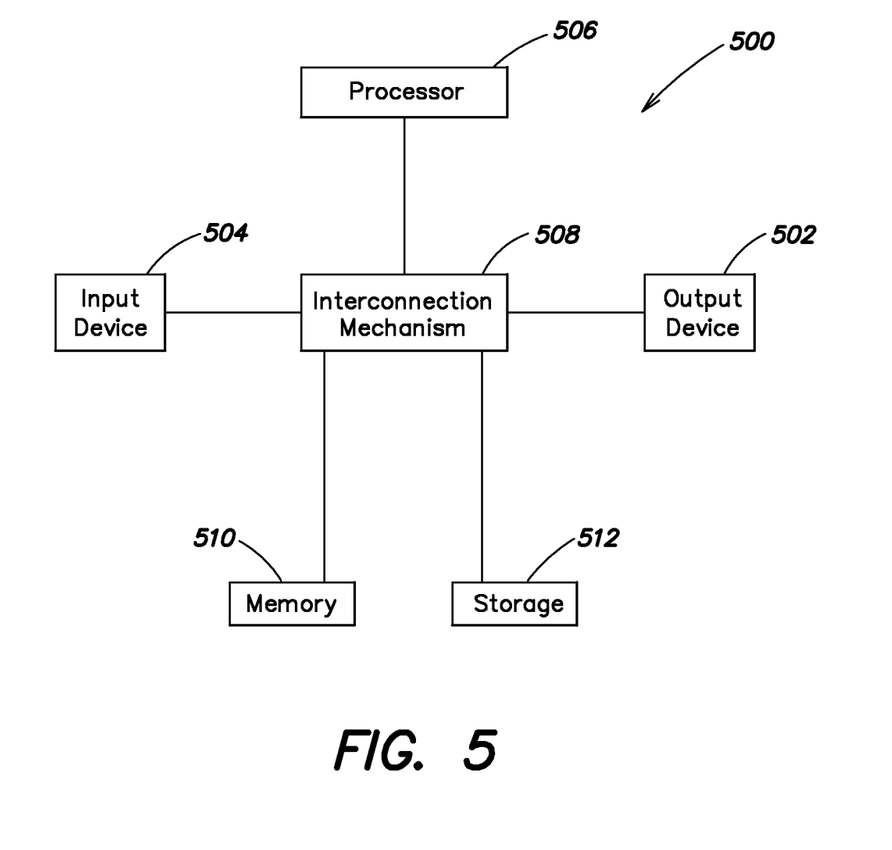
FIG. 5 is a block diagram of an example distributed database system in which various aspects of the present invention can be practiced.

FIG. 5 shows a block diagram of an example special-purpose computer system 500 on which various aspects of the present invention can be practiced. For example, computer system 500 may include a processor 506 connected to one or more memory devices 510, such as a disk drive, memory, or other device for storing data. Memory 510 is typically used for storing programs and data during operation of the computer system 500. Components of computer system 500 can be coupled by an interconnection mechanism 508, which may include one or more busses (e.g., between components that are integrated within a same machine) and/or a network (e.g., between components that reside on separate discrete machines). The interconnection mechanism enables communications (e.g., data, instructions) to be exchanged between system components of system 500.

Computer system 500 may also include one or more input/output (I/O) devices 502-504, for example, a keyboard, mouse, trackball, microphone, touch screen, a printing device, display screen, speaker, etc. Storage 512 typically includes a computer readable and writeable nonvolatile recording medium in which computer executable instructions are stored that define a program to be executed by the processor or information stored on or in the medium to be processed by the program.

Figure 6:
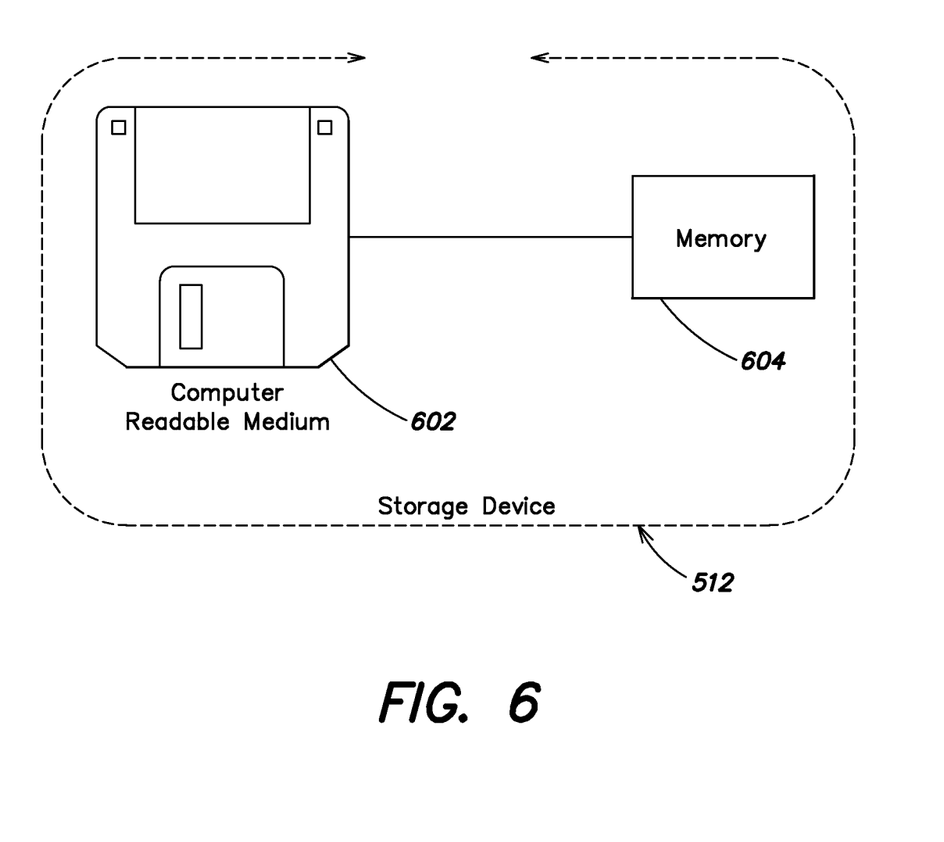
FIG. 6 is a block diagram of an example distributed database system in which various aspects of the present invention can be practiced.

The medium can, for example, be a disk 602 or flash memory as shown in FIG. 6. Typically, in operation, the processor causes data to be read from the nonvolatile recording medium into another memory 604 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 5, the memory can be located in storage 512 as shown, or in memory system 510. The processor 506 generally manipulates the data within the memory 510, and then copies the data to the medium associated with storage 512 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 500 is shown by way of example, as one type of computer system upon which various aspects of the invention can be practiced, it should be appreciated that aspects of the invention are not limited to being implemented on the computer system as shown in FIG. 4. Various aspects of the invention can be practiced on one or more computers having a different architectures or components than that shown in FIG. 5.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Figure 7:
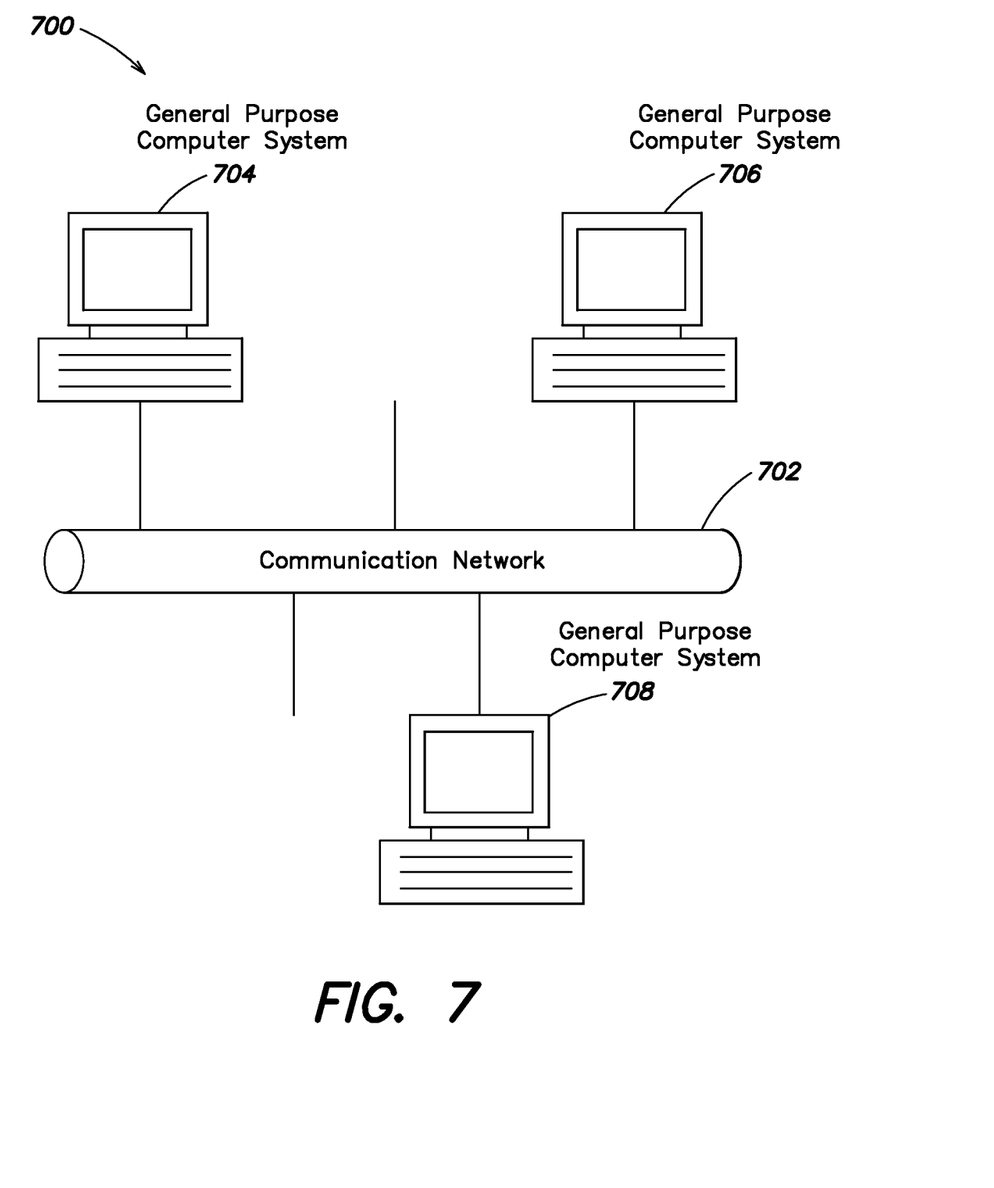
FIG. 7 is a block diagram of an example distributed database system in which various aspects of the present invention can be practiced.

Various aspects of this invention can be implemented by one or more systems similar to system 700 shown in FIG. 7. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 7 shows an architecture diagram of an example distributed system 700 suitable for implementing various aspects of the invention. It should be appreciated that FIG. 7 is used for illustration purposes only, and that other architectures can be used to facilitate one or more aspects of the invention.

System 700 may include one or more specially configured special-purpose computer systems 704, 706, and 708 distributed among a network 702 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:
1. A distributed database system, comprising:
 a non-relational database for storing a plurality of database documents, wherein the non-relational database includes a storage architecture configured to accept documents of dynamic architecture into one or more respective collections of the documents;

an index engine configured to:
  receive at least one index field, at least one index field value, a criteria field, and a criteria condition, wherein the criteria field is different from the at least one index field; and
  generate a partial index comprising the at least one index field and the at least one index field value from at least one document of the plurality of documents, wherein the index maps to any of a subset of documents within a collection that contain the criteria field and satisfy the criteria condition, the subset including one or more documents within the collection not containing the index field at identification; and
a query engine configured to:
  identify a search query containing the at least one index field;
  determine that the search query is guaranteed to match a set of documents that is contained within the subset of documents; and
  access the partial index to respond to the search query.

2. The system of claim 1, wherein the index engine is further configured to resolve the criteria condition based on at least one of a comparison operator, arithmetic operator, bitwise operator, and operators on null.

3. The system of claim 1, wherein the system is configured to resolve the criteria field and the criteria condition.

4. The system of claim 3, wherein the system is configured to find a subset of documents that contain the criteria field and that satisfy the criteria condition.

5. The system of claim 4, wherein the system is configured to pass the subset of documents for index generation.

6. The system of claim 1, wherein the generation of the partial index is executed based on stages, including a filter stage and an index generation stage.

7. The system of claim 1, wherein the partial index includes a key referencing the at least one document of the plurality of documents.

8. The system of claim 1, wherein the plurality of database documents are a collection of documents in a non-relational database.

9. The system of claim 8, wherein the index engine is further configured to identify, in the collection of documents, at least one document configured to store the criteria field.

10. The system of claim 1, wherein the index engine is further configured to resolve the criteria condition which comprises at least a comparison operator and a comparison value.

11. The system of claim 10, wherein the index engine is further configured to resolve the criteria condition based on the comparison operator selected from a group including at least a greater-than operator, a less-than operator, an equals operator, and a does-not-equal operator.

12. The system of claim 1, wherein the index engine is further configured to resolve the criteria condition wherein the criteria condition comprises a logical operator for determining whether the criteria field is set in the at least one document of the plurality of documents.

13. The system of claim 1, wherein at least one of the plurality of documents does not include the criteria field.

14. A method for creating a database index for a plurality of database documents, comprising acts of:
  receiving at least one index field to be included in the database index;
  receiving a criteria field and a criteria condition, wherein the criteria field is different from the at least one index field;
  generating a partial index comprising the at least one index field and field value from at least one document of the plurality of documents, wherein generating the partial index comprises:
    determining that a subset of the plurality of documents contain the criteria field and satisfy the criteria condition; and
    mapping the partial index to the subset of the plurality of documents;
  identifying a search query containing the at least one index field;
  determining that the search query is guaranteed to match a set of documents that is contained within the subset of documents to which the index maps; and
  accessing the partial index to respond to the search query.

15. The method of claim 14, further comprising identifying documents that contain the criteria field and satisfy the criteria condition.

16. The method of claim 15, further comprising generating the partial index from the identified documents.

17. The method of claim 14, wherein the plurality of database documents are a collection of documents in a non-relational database.

18. The method of claim 17, further comprising identifying, in the collection of documents, at least one document configured to store the criteria field.

19. The method of claim 14, wherein the method further comprising resolving at least one of a comparison operator, arithmetic operator, bitwise operator, and operators on null to determine whether the criteria condition is satisfied.

20. The method of claim 19, wherein the comparison operator is selected from the group consisting of a greater-than operator, a less-than operator, an equals operator, and a does-not-equal operator.

21. The method of claim 14, wherein the criteria condition comprises a logical operator for determining whether the criteria field is set in the at least one document of the plurality of documents.

* * * * *